(No Model.)
G. H. BENJAMIN.
GLASS MELTING FURNACE.
No. 312,422. Patented Feb. 17, 1885.
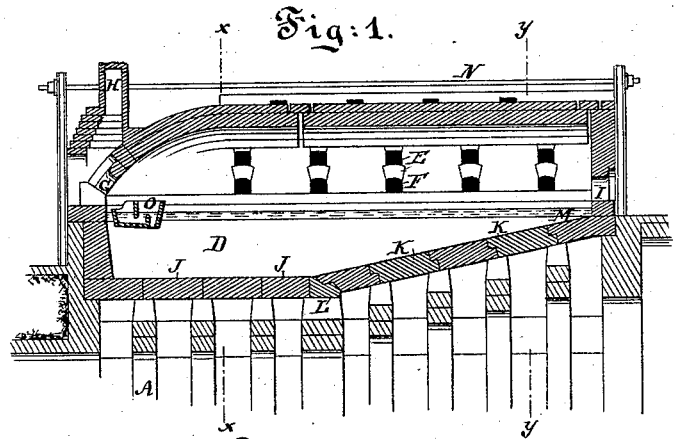
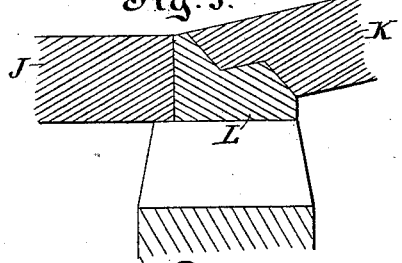
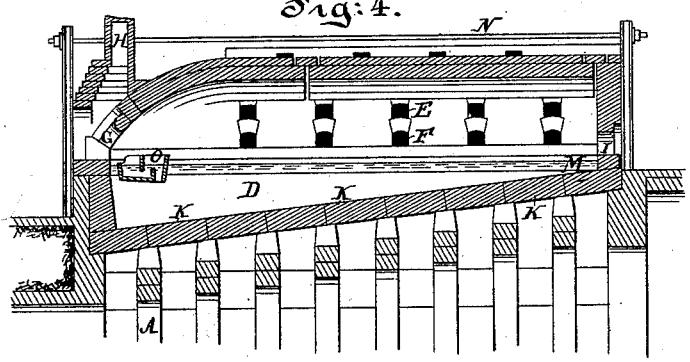
Witnesses:
A. E. Saxton
A. J. Stewart
Inventor:
Geo. H. Benjamin
by Park Benjamin & Bro.
Attys.

(No Model.)
G. H. BENJAMIN.
GLASS MELTING FURNACE.
No. 312,422. Patented Feb. 17, 1885.
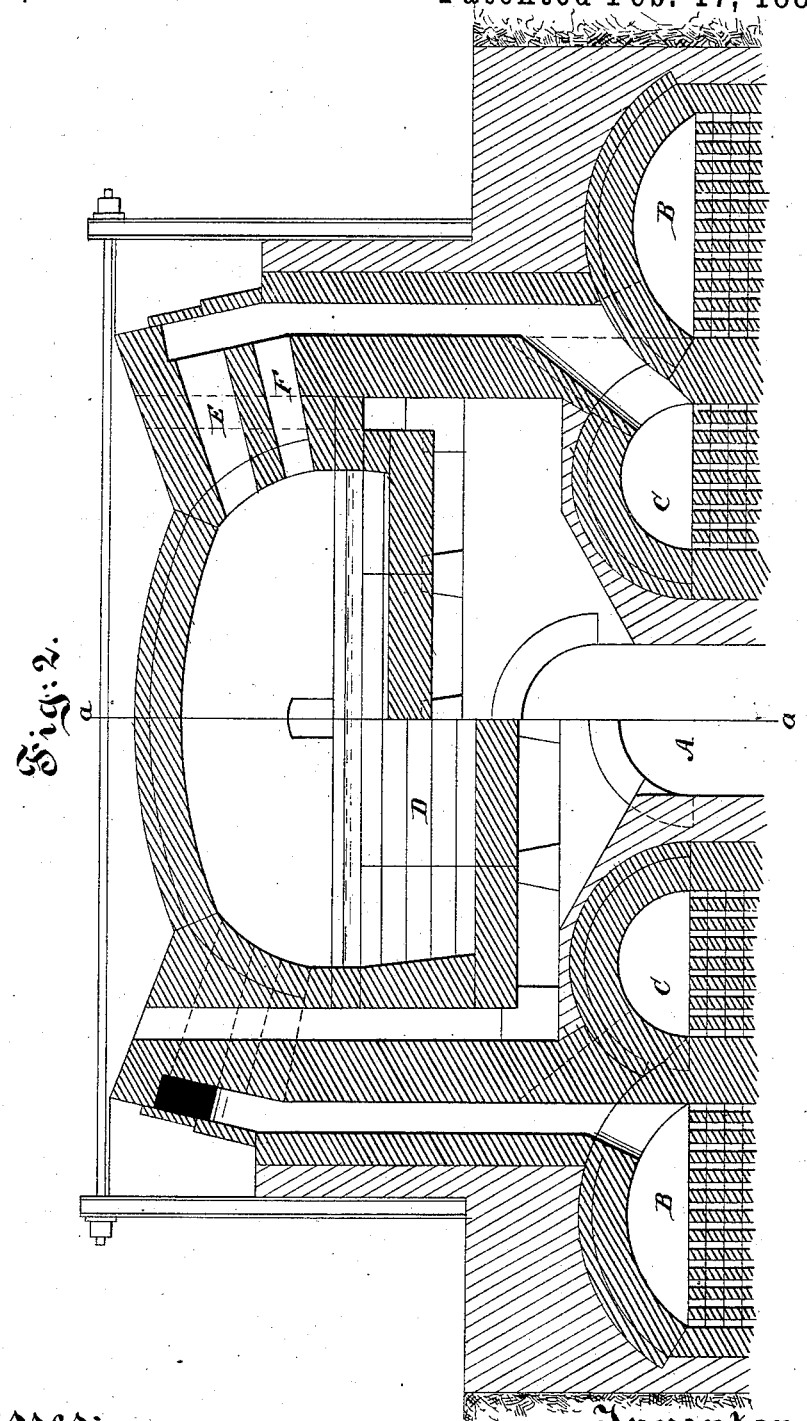
Witnesses:
A. J. Stewart.
A. E. Saxton.
Inventor:
Geo. H. Benjamin
by Park Benjamin & Bro Atty

UNITED STATES PATENT OFFICE.

GEORGE H. BENJAMIN, OF SHORT HILLS, NEW JERSEY.

GLASS-MELTING FURNACE.

SPECIFICATION forming part of Letters Patent No. 312,422, dated February 17, 1885.

Application filed October 15, 1883. (No model.)

*To all whom it may concern:*

Be it known that I, GEORGE H. BENJAMIN, of Short Hills, county of Essex, State of New Jersey, have invented a new and useful Improvement in the Construction and Method of Working Glass-Melting Furnaces, of which the following is a full, clear, and exact specification.

My invention relates to that class of glass-melting furnaces for which Letters Patent of the United States No. 261,054 were granted to Frederick Siemens, July 11, 1882, and to the furnaces more particularly referred to in the prior patents of the said Frederick Siemens and Charles Wm. Siemens, inasmuch as I use in the construction of the particular form of melting-tank hereinafter described many of the features and arrangement of parts—such, for instance, as the arrangement of the gas and air flues, ventilating-cave under the tank, &c.—as fully set forth and described in the specification above referred to.

My invention consists, broadly, in so constructing a tank for the continuous melting and fining of glass that its bottom shall be more or less inclined downward from the charging end (the end where the batch or raw material is introduced) toward the gathering end, (the end from which the melted metal is taken.)

My invention also consists in a method of working glass-melting furnaces whereby the heat becomes applied more uniformly to the charge or batch and the latter becomes more thoroughly fluxed, the result being a more uniform and quicker melting, with less expenditure of fluxing material, than is now the case, and the prevention of the formation of deposits in the tank, or what is technically known as "cords" and "stones."

In the accompanying drawings, Figure 1 is a longitudinal section on the line *a a* of Fig. 2, showing the construction of a deep glass-furnace according to this invention. Fig. 2 represents two half transverse sections thereof, the left half on the line *x x* and the right half on the line *y y* of Fig. 1. Fig. 3 is a transverse section of the center bottom block and the adjoining blocks, showing one method of making the joint between the horizontal and inclined blocks of the furnace-bottom. Fig. 4 is a longitudinal section showing the bottom of the tank wholly inclined.

The furnace illustrated in Figs. 1 and 2 is quite similar in general construction to that described and claimed in Letters Patent granted to Frederick Siemens, and numbered 261,054, with the exception that the bottom of the furnace is inclined from the charging end to a point at or just beyond the middle of the tank.

I prefer to construct the furnace as follows:

A is the cave, with the regenerative chambers B B, for air, and C C, for gas, arranged on each side of it and below the tank D.

E and F are flues for conveying the heated air and gas up from the regenerative chambers on the one side, while the products of combustion pass down by corresponding flues to regenerative chambers on the other side, this movement from time to time being alternated in the known manner according to which regenerative gas-furnaces are operated.

G is one of the working-out holes, of which a number are arranged at one end of the tank, each having a flue, H, to cause a draft of air for the protection of the workmen.

I is one of the feeding-doors, of which there may be several at the end opposite to that where the glass is worked out.

J J are the bottom blocks of the tank, which are laid horizontally.

K K are the bottom blocks of the tank, which have an inclined position.

L is the junction-block between the horizontal and vertically-inclined blocks.

M is the junction-block between the vertically-inclined blocks and the rear end of the furnace. The bottom and sides of the tank are externally cooled by air-currents through and from the cave A and through the flues N.

O is the gathering-vessel.

The tank D may be made of any required depth at the gathering end, but preferably not less than eighteen inches. At the charging end the depth should not be less than six inches, which should be gradually increased until a point just beyond the center of the tank is reached. I do not, however, limit myself to the particular inclination of the tank-bottom as here given, as it may be necessary to vary the same, depending upon the character and quality of the glass made—as, for instance, the inclination may be more gradual and extend to a point nearer the gathering end, or the inclination may be greater and not extend so far, as shown.

In continuous melting tanks shown in former patents the bottom of the tank has always been made level, so that the metal in the tank has the same vertical depth at the gathering end that it has at the charging end.

I am aware that glass-melting tanks have been made where the body of the tank has been divided into two or more compartments separated by means of bridges, and where the vertical depth has increased in each successive compartment from the charging to the gathering end. Both of these forms of tanks have been found to be open to many objections, and it is the object of the present invention to overcome the difficulties which practical experience has demonstrated.

It is found in practice in operating a glass-melting tank having considerable vertical depth over its whole extent that the batch or glass-melting materials are not always uniformly melted. This is owing to the fact that the materials which make up the batch, upon being charged on the mass of molten metal in the tank, are not uniformly acted upon by the high temperature to which they are exposed. The reason for this is that certain materials of the batch—namely, soda and lime—are more rapidly fused than the sand or silica, the result being that a fluid formed by the fusion of the soda and lime forms upon the top of the metal in the tank, known as the "salt-water," while the heavier particles of sand sink into the body of the metal, and are not subjected to a temperature sufficient to cause their proper combination with the fluxes. Salt-water acts as a non-conductor of heat, while the great vertical depth of the tank at the charging end—generally from ten to twenty-four inches in depth—prevents the heat from acting effectively upon the particles of sand. As a consequence the bottom of the tank becomes covered with the wholly or partially uncombined particles from the batch. The depth of this uncombined material gradually increases toward the charging end. This condition does little harm until an excess of fluxing material is introduced into the tank, or the temperature of the tank becomes considerably increased, and what is known as "boiling" occurs. Then the uncombined portions are acted upon and mixed with the body of the metal, destroying its homogeneity, or, in other words, giving rise to what are technically called "cords" and "stones" in the metal.

In my present invention a portion of the bottom of the tank is shown to be inclined, while the rest of the bottom is horizontal. It is not essential that the inclined bottom should have any particular degree of inclination, as in the manufacture of the different classes and kinds of glass it may be necessary to increase or diminish the inclination.

The peculiar office of the inclined bottom is that the glass-making materials, upon being charged into the furnace, are for a longer time subjected to a high temperature, and thus a more perfect combination of the glass-making materials is brought about. As the melted material flows down the inclined portion of the tank-bottom toward the gathering end the vertical depth is increased, and consequently the heavier metal, which occupies the lower zone, and which is best, is not exposed to such a high temperature, and is therefore in a better condition to be picked up by the gathering-vessel preparatory to being withdrawn from the tank.

I do not limit myself to any particular method of laying the bottom blocks, but preferably use that shown in the drawings, where the horizontal bottom blocks rest upon arches and meet the junction-block L. The junction-block L rests upon a broad arch, and has rabbets upon its side calculated to receive an extended portion on the side of the vertically-ascending blocks K. The blocks K are made square, and have an ordinary lap-joint, as shown, and rest upon arches having a gradually-increasing height.

The object of building the arches of the cave in this way is that the currents of air, as they pass through the cave and under the bottom blocks of the tank, impinge directly upon the under surface of the vertically-inclined blocks, and thus that part of the tank where the greatest heat is applied is more thoroughly cooled on its under surface, and all danger of leakage is avoided.

Having thus fully described my invention, what I claim, and desire to secure by Letters Patent, is—

1. A glass-melting tank in which the surface of the molten metal contained therein is preserved constantly level, having its bottom inclined downwardly from the charging end toward the gathering end, substantially as described.

2. A glass-melting tank in which the surface of the molten metal contained therein is preserved constantly level, having one portion of its bottom horizontal and the other portion inclined, the horizontal portion being adjacent to the gathering end and the inclined portion adjacent to the charging end, substantially as described.

3. Improvement in the art of subjecting a charge in a glass-melting tank to the gradual application of heat, consisting of treating said charge in a tank so arranged and adapted that the surface of the molten metal contained therein shall be preserved constantly level, and having a bottom wholly or partially inclined from the charging end toward the gathering end, whereby said charge, when melted, becomes of varying depth above said bottom and below the hot gases or other source of heat, substantially as described.

4. The combination, in a glass melting or fining tank in which the surface of the molten metal contained therein is preserved constantly level, of a bottom wholly or partially inclined downwardly from the charging end toward the gathering end, and air and gas flues opening into said tank above said bottom, substantially as described.

5. The combination, in a glass-melting tank in which the surface of the melted material contained therein is preserved level, of a bottom inclined from the charging end toward the gathering end, and arches gradually varying in height, arranged beneath and forming supports for said inclined bottom, substantially as described.

6. The combination, in a glass-melting tank in which the surface of the molten material contained therein is preserved level, of a bottom downwardly inclined, a charging-aperture arranged in the end of said tank and adjacent to the most elevated part of said bottom, a gathering-aperture arranged in the end of the tank adjacent to the most depressed part of said bottom, and flues for the admission of gas and air to be burned and for the escape of the products of combustion thereof, arranged in the wall of said tank and above said bottom, substantially as described.

7. In a glass-melting tank, and in the bottom thereof, the combination of the horizontal blocks J, junction-block L, inclined blocks K, and junction-block M, substantially as described.

GEORGE H. BENJAMIN.

Witnesses:
A. E. SAXTON,
A. S. STEUART.